United States Patent
Daman et al.

(10) Patent No.: US 10,057,244 B2
(45) Date of Patent: Aug. 21, 2018

(54) UTILIZING VEHICLE INFORMATION AS A SECURITY PIN/PASSKEY

(71) Applicant: DENSO International America, Inc., Southfield, MI (US)

(72) Inventors: Laith Daman, Novi, MI (US); Kyle Golsch, Pontiac, MI (US)

(73) Assignee: DENSO International America, Inc., Southfield, MI (US)

( * ) Notice: Subject to any disclaimer, the term of this patent is extended or adjusted under 35 U.S.C. 154(b) by 155 days.

(21) Appl. No.: 14/795,433

(22) Filed: Jul. 9, 2015

(65) Prior Publication Data

US 2016/0080357 A1 Mar. 17, 2016

Related U.S. Application Data

(60) Provisional application No. 62/049,810, filed on Sep. 12, 2014.

(51) Int. Cl.
*H04L 29/06* (2006.01)
*H04W 12/06* (2009.01)
*H04L 29/08* (2006.01)

(52) U.S. Cl.
CPC .......... *H04L 63/083* (2013.01); *H04W 12/06* (2013.01); *H04L 67/12* (2013.01)

(58) Field of Classification Search
CPC ....... H04L 63/083; H04L 67/12; H04W 12/06
See application file for complete search history.

(56) References Cited

U.S. PATENT DOCUMENTS

| | | | |
|---|---|---|---|
| 2012/0216044 A1* | 8/2012 | Chung | H04L 63/061 713/182 |
| 2014/0270158 A1* | 9/2014 | Peirce | H04L 9/0819 380/44 |
| 2015/0134427 A1* | 5/2015 | Borras | G06Q 30/0284 705/13 |

* cited by examiner

*Primary Examiner* — Ghodrat Jamshidi
(74) *Attorney, Agent, or Firm* — Harness, Dickey & Pierce, P.L.C.

(57) ABSTRACT

A method for connecting a mobile device to a vehicle system of a vehicle. The method includes the following: generating a passkey based on at least one of vehicle information and an image accessible to an occupant of the vehicle; transmitting instructions for composing the passkey to the mobile device; and connecting the mobile device to the vehicle system subsequent to entry of the passkey at the mobile device.

15 Claims, 2 Drawing Sheets

UTILIZING VEHICLE INFORMATION AS A SECURITY PIN/PASSKEY

FIELD

Figure 1:
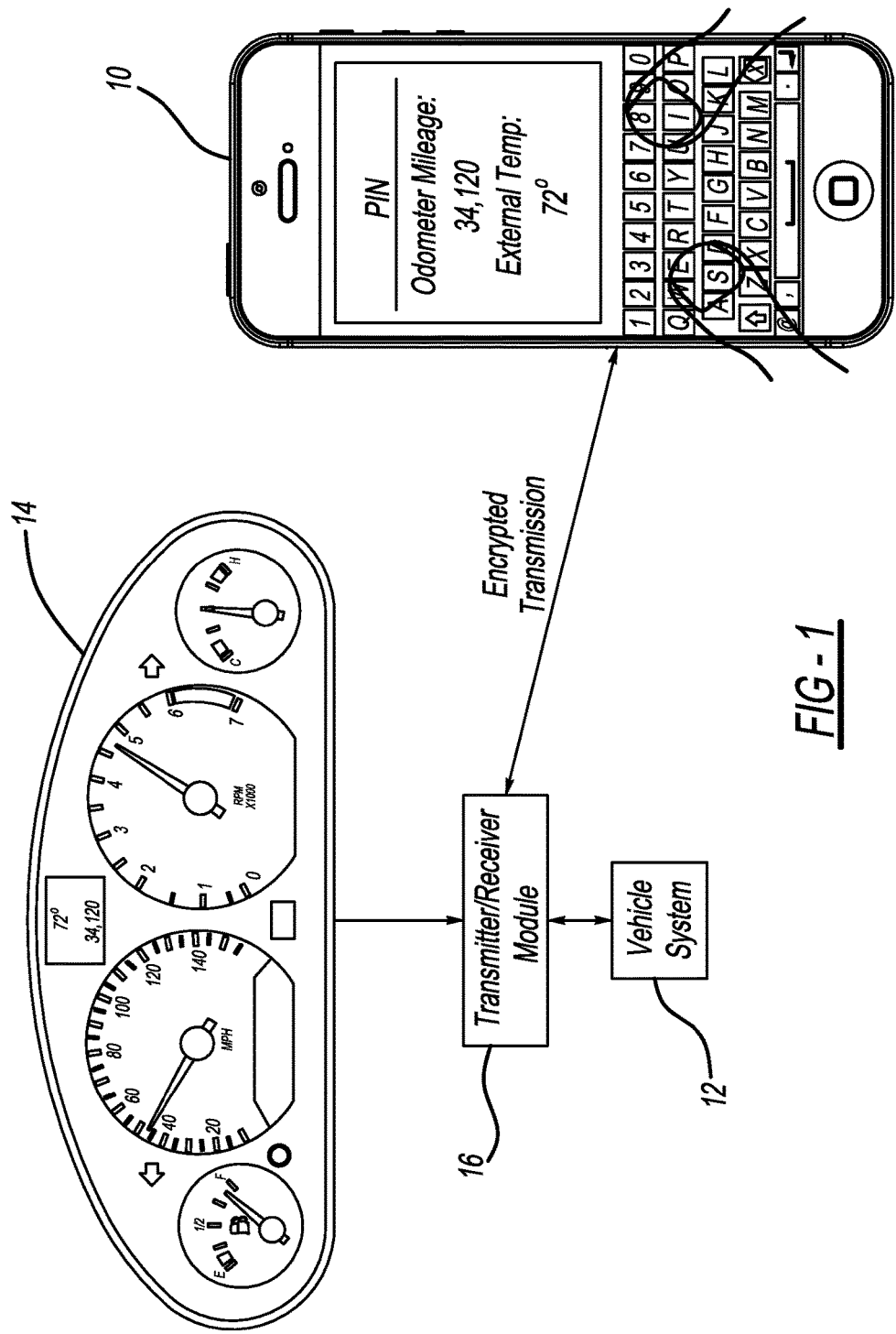

The present disclosure relates to systems, methods, and devices for using vehicle information as a security PIN or passkey, such as when connecting a mobile device to a vehicle system.

BACKGROUND

This section provides background information related to the present disclosure, which is not necessarily prior art.

When connecting a mobile device wirelessly to a vehicle system, such as with a Bluetooth or WI-FI connection, a personal identification number (PIN) and/or passcode entry is often required. The highest level of security is typically achieved when the PIN/passcode entry is conducted through out-of-band (OOB) communication. With OOB communication, the PIN/passkey is typically not transmitted over the air in order to avoid eavesdropping. While existing PIN and/or passcode systems for connecting a mobile device to a vehicle system are suitable for their intended use, they are subject to improvement. For example, an improved OOB communication system would be desirable.

SUMMARY

This section provides a general summary of the disclosure, and is not a comprehensive disclosure of its full scope or all of its features.

The present teachings provide for a method for connecting a mobile device to a vehicle system of a vehicle. The method includes the following: generating a passkey based on at least one of vehicle information and an image accessible to an occupant of the vehicle; transmitting instructions for composing the passkey to the mobile device; and connecting the mobile device to the vehicle system subsequent to entry of the passkey at the mobile device.

The present teachings further provide for a method for connecting a mobile device to a vehicle system of a vehicle. The method includes the following: generating a passkey with a passkey generator onboard the vehicle based on vehicle data accessible to an occupant of the vehicle; transmitting instructions for composing the passkey from the vehicle to the mobile device without transmitting the passkey; receiving an encrypted transmission from the mobile device including the passkey input by a user of the mobile device; decrypting the encrypted transmission, and comparing the passkey input by the user at the mobile device to the passkey generated with the passkey generator; and wirelessly connecting the mobile device to the vehicle system if the passkey input by the user at the mobile device matches the passkey generated by the passkey generator.

The present teachings also provide for a system for connecting a mobile device to a vehicle system. The system includes the following: a passkey generator configured to generate a passkey based on vehicle data accessible to an occupant of the vehicle; a transmitter configured to transmit instructions to the mobile device for composing the passkey; and a pairing system for wirelessly pairing the mobile device to the vehicle system subsequent to entry of the passkey at the mobile device.

Further areas of applicability will become apparent from the description provided herein. The description and specific examples in this summary are intended for purposes of illustration only and are not intended to limit the scope of the present disclosure

DRAWINGS

The drawings described herein are for illustrative purposes only of selected embodiments and not all possible implementations, and are not intended to limit the scope of the present disclosure.

Figure 2:
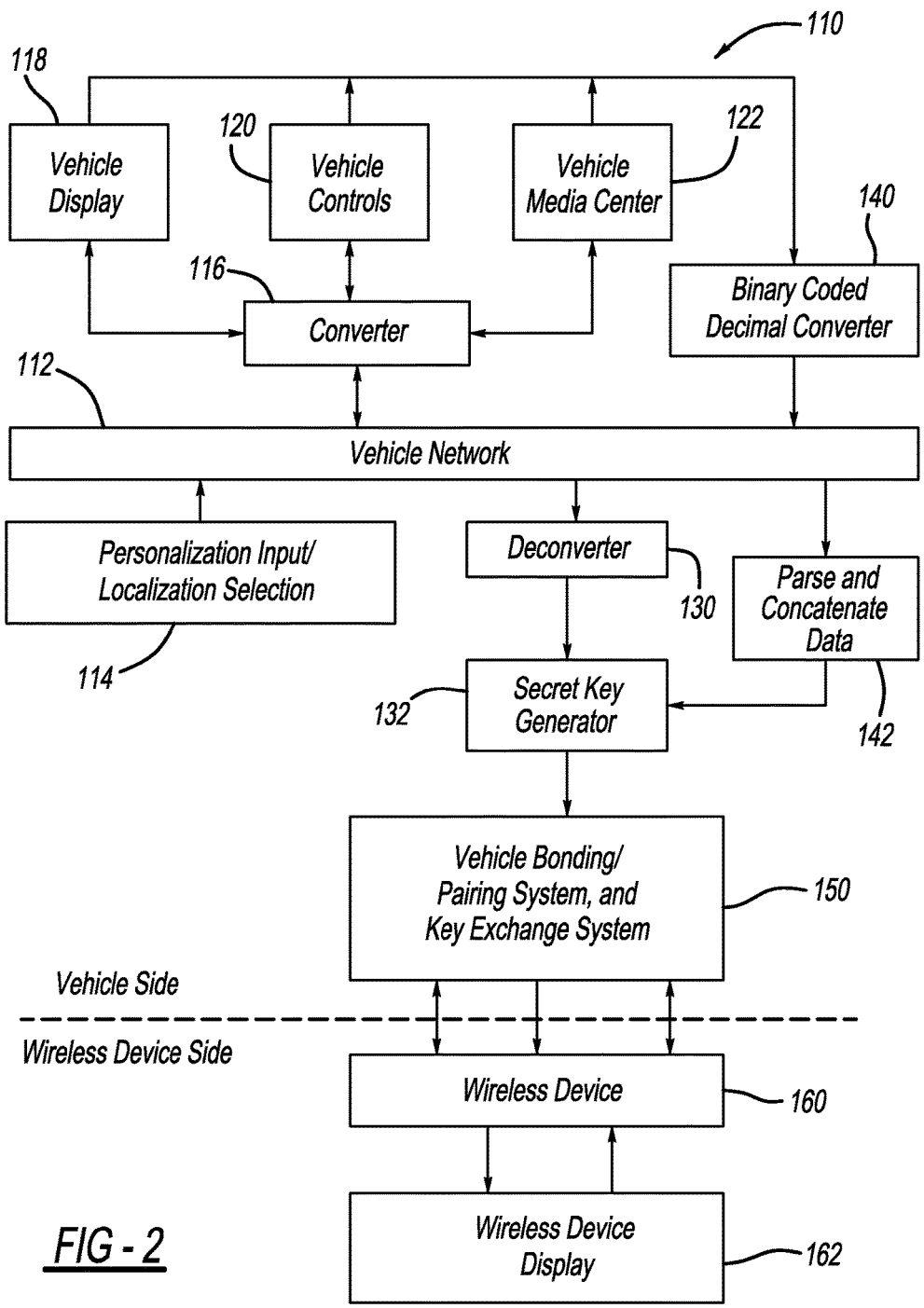

FIG. 1 illustrates use of vehicle information as a security PIN/passkey for connecting a mobile smart device to a vehicle network system according to the present teachings; and FIG. 2 illustrates additional features of devices, systems, and methods according to the present teachings for use of vehicle information as a security PIN/passkey for connecting a mobile smart device to a vehicle network system.

Corresponding reference numerals indicate corresponding parts throughout the several views of the drawings.

DETAILED DESCRIPTION

Example embodiments will now be described more fully with reference to the accompanying drawings.

The present teachings provide for methods, systems, and devices for communication of vehicle data or other information, images, etc. that the user is able to obtain, and use of the vehicle data, etc. as a personal identification number (PIN)/passkey for connecting or pairing a mobile device with a vehicle system. The mobile device can be connected to the system in any suitable manner, such as wirelessly. Any suitable wireless connection can be used, such as Bluetooth or Wi-Fi, for example. The mobile device can be any suitable mobile device, such as a smartphone, tablet computer, wearable device, fitness monitor, laptop computer, etc. The vehicle system can be any suitable vehicle or non-vehicle system, such as a communication system, an entertainment system, a navigation system, etc. The system may be onboard any suitable vehicle, such as a car, truck, SUV, bus, aircraft, train, military vehicle, watercraft, etc. The system may also be a non-vehicle system, and thus includes entertainment and communication systems, for example, based in a home, office, hotel, airport etc.

During pairing, the present teachings provide that the mobile device request (or more specifically that an application run on the mobile device requests) the user to enter vehicle information (such as odometer digits and cabin temperature or any other suitable information, image, etc.) to encrypt a message, which is then transmitted to the vehicle. The vehicle system obtains, or receives inputs identifying, the same vehicle information (such as odometer and temperature data or any other suitable information, image, etc.) and uses this information as a PIN/passkey to decrypt the message received from the mobile device. Any suitable combination of data known to an occupant of the vehicle can be used, such as the following: tire pressure for one or more wheels; vehicle position, such as latitude and longitude; odometer; temperature; radio station; last song name and/or artist name; and/or any arbitrary message, image, and/or pattern displayed on an in-vehicle infotainment (IVI) screen or instrument panel cluster. For example, the IVI screen or instrument panel cluster could display an image and/or pattern, which is input to the smart device by taking a picture of the image and/or pattern with a camera of the smart device. Any suitable image/pattern can be used, such as a person's picture, a random design, or any other random item.

For example, a random pattern of black and white boxes can be used, or a sequence of triangular shapes can be used. A color gradient generated in any suitable manner can also be used, such as a color gradient generated based on the X, Y, Z axis of the vehicle as measured by an accelerometer. The actual numerical values measured by the accelerometer can be used as the PIN/passkey as well.

The present teachings provide numerous advantages. For example, the present teachings provide secure out-of-band communication in symmetric-key algorithms cryptography. Symmetric-key algorithms are a class of algorithms for cryptography that use the same cryptographic keys for both encryption of plaintext and decryption of ciphertext. The keys may be identical or there may be a simple transformation to go between the two keys. The keys, in practice, represent a shared secret between two or more devices that can be used to maintain a private information link. The present teachings are further advantageous because the PIN/passkey is random and immune to eavesdropping. The PIN/passkey is further advantageously applicable as a PIN in asymmetric encryptions.

With reference to FIG. 1 for example, the present teachings generally provide for pairing a wireless smart device 10 with any suitable vehicle system 12, such as a vehicle communication and entertainment system, by inputting at the smart device 10 vehicle data, or any other suitable information, image, etc. that serves as a PIN/passkey to authorize the pairing. In the example illustrated, the vehicle data is in the form of the vehicle's current mileage and the current outside temperature as displayed at instrument cluster 14. The smart device 10 receives instructions from transmitter/receiver module 16 regarding how to compose the PIN/passkey, as described herein. The vehicle data input to the smart device 10 is transmitted to the transmitter/receiver module 16 onboard a vehicle using any suitable encrypted transmission technique. The transmitter/receiver module 16 also receives the vehicle data (in this example the vehicle's current mileage and the external temperature) from the instrument cluster 14 or from any other suitable source. The transmitter/receiver module 16 decrypts the transmission from the smart device 10 and compares the data received with the vehicle data from the instrument cluster 14. If there is a match, the smart device 10 will be paired with the vehicle system 12 in any suitable manner.

With continued reference to FIG. 1 and additional reference to FIG. 2, additional features of the present teachings will be described. Reference numeral 110 of FIG. 2 generally refers to systems, methods, and devices according to the present teachings for using vehicle information, or any other suitable information, image, etc., as a security PIN/passkey for pairing the smart device 10 with any suitable vehicle system 12, such as an entertainment system, communication system, navigation system, etc. The pairing can take place by way of any suitable vehicle network 112. The vehicle network 112 can be any suitable vehicle network (including gateways), such as CAN, LIN, or MOST for example.

With reference to block 114 of FIG. 2, information regarding how vehicle information will be displayed/interpreted on various displays, is input to the vehicle network 112. For example, personalization/localization data (current display unit/language or culture and units etc.) can be input into the vehicle network 112. Personalization options include the ability to select from the following: miles or kilometers; Fahrenheit or Celsius; date/time format; text encoding/label text, etc. With reference to block 116, a converter (such as a conversion layer or converter module) receives information, such as vehicle level precision and personalization/culture information, to convert it into displayable data, or vice versa takes knob or other physical switch information and converts it into network information at appropriate precision and units.

At block 118 is a vehicle display. The display 118 can be any suitable display, such as an instrument panel cluster display (illustrated in FIG. 1 at 14) or HUD display. The display 118 can be configured to display any suitable information, such as a trip odometer, tire pressure readings for one or more tires, navigation information, and cabin temperature. With reference to block 120, physical controls/knobs can be provided to control various vehicle features. For example, a cabin temperature control knob and a volume knob can be included. With reference to block 122, a media center can be included. The media center 122 can include any suitable functions, such as navigational functions or in-vehicle infotainment functions, and can be an exemplary vehicle system 12 (see FIG. 1). Various information from blocks 118, 120, and 122 can be input to the converter 116, such as: the odometer, tire pressure, and cabin temperature readings from the vehicle display of 118; the readings/position of temperature and volume knobs from 120; and song names, text of a label on a display, and radio station frequency/name from 122.

With reference to block 130, a deconverter is included. Vehicle network information and personalization/culture information from the converter of block 116 is input into the deconverter 130. The deconverter 130 decomposes the raw high resolution data into cultural displayed data. For example, odometer resolution is usually in millimeters, but if the vehicle is in the United States then the personalization/cultural units are in miles. The present teachings also provide that the personalization/culture settings can be entered by the user upon entering the PIN/passkey data from the vehicle. For example, the user can enter an odometer number 234 as the PIN/passkey and also select the units (kilometers/miles). The personalization/culture settings can also be acquired from the mobile device side in situations where the mobile device is used to customize vehicle settings and the vehicle shares the user settings with the mobile device upon changes made within the vehicle.

Data obtained from the vehicle that matches the data that is displayed/visible to the driver (display data or control settings (knob, switch, etc.)) is input into a secret key generator at block 132 from the deconversion layer of block 130. The secret key generator 132 generally selects from available display data and creates a secret key generator from one or a combination of many data inputs (concatenation or mathematical operation thereof). More specifically, the secret key generator can select dynamically among different types of data and size of the secret key to randomize the process. For example, the right-most odometer 2-digits concatenated with left-front tire pressure 2-digits concatenated with cabin temperature 2-digits, results in a 6-digit secret key. Alternatively, the secret key generator can select right-rear tire pressure and/or re-order the sequence of concatenation. The output is an instruction message to be sent to the mobile device 10 (illustrated in FIG. 2 at 160) for the sequence of and the particular physical data to be entered, and the secret key composition.

With reference to block 140, an alternative embodiment is included in which display data is transmitted to the vehicle network 112 in binary coded decimal (BCD) format. Data-definition and data from the vehicle network 112 is input from the vehicle network 112 to block 142, where the data is parsed and concatenated and then input to the secret key generator at block 132.

With reference to block 150, the present teachings provide for a system for bonding/pairing or managing wireless security where key exchange occurs based on sharing of out-of-band PIN/passkey or numeric data. From block 132, the secret key and a message of how the key was derived is input to block 150. For example, the message may indicate that the secret key was derived from "trip A odometer" or "concatenate driver front tire with cabin temperature." The system of block 150 manages the wireless communication and initial pairing with the wireless mobile device 160 (FIG. 1 at 10). For example, the system of block 150 can send the instructional message, and await an encrypted message from the wireless mobile device 10/160. Also, the system of block 150 utilizes the secret key composition to decrypt the message received from the wireless device 10/160.

Further, the instructional message can include a mathematical formula for how to compose the secret key. This can be done to randomize the numbers at a dealer lot, and adds a layer for "in the moment" creation of the secret key. An entropy layer can generate random seeds with or without sequence of concatenation of the physical data. An example constant multiplier secret key formula is as follows: secret key (94849)*(concatenation (2-digits from odometer), (2-digits from left-front tire pressure), (2-digits from cabin temperature). If the results exceed a pre-agreed upon length (such as a 6-digit passkey or 16-digit passkey), then a truncation of the right most desired digits can be applied. An example of a more complex formula (such as a sphere's surface area $A=4\pi r^2$) is as follows: secret key=4*3.14* (concatenation (2-digits odometer), (2-digits left-front tire pressure), (2-digits cabin temperature))$^2$. If the result exceeds a pre-agreed upon length, such as a 6-digit passkey or a 16-digit passkey, then a truncation of right-most desired digits can be applied.

The system of block 150 at the vehicle side can send instructions on how to compose the secret key from available display data to the mobile/wireless device at 160 (also illustrated in FIG. 1 at reference numeral 10). The mobile device 10/160 inputs the secret key instructions to a display of the mobile device at block 162, where the display displays instructions for composing the secret key and an entry method for entering the secret key. Once the user enters the secret key, such as by way of the display, the secret key is input to the wireless device of block 160. The wireless device 10/160 accepts the user entry of the secret key and initiates the process of establishing a long-term relationship using a long-term key based on the secret key data. The wireless mobile device 10/160 begins communication with the vehicle side based on an encrypted and trusted (authenticated and/or encrypted) link. Wireless bonding/pairing, authentication, or a link based on long-term key exchange derived from the secret key is established between blocks 150 and 160.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A method for connecting a mobile device to a vehicle system of a vehicle comprising:
    generating a passkey by a secret key generator onboard the vehicle based on vehicle information accessible to an occupant of the vehicle;
    transmitting instructions for composing the passkey from the vehicle to the mobile device; and
    connecting the mobile device to the vehicle system subsequent to entry of the passkey at the mobile device, entry of the passkey at the mobile device authenticates a user of the mobile device as authorized to access the vehicle system by way of the mobile device;
    wherein the passkey is not transmitted to the mobile device.

2. The method of claim 1, further comprising generating the passkey at the vehicle system.

3. The method of claim 2, further comprising transmitting instructions for composing the passkey from the vehicle system to the mobile device.

4. The method of claim 1, further comprising generating the passkey based on one or more of the following: tire pressure reading from one or more wheels; vehicle position; odometer reading; cabin temperature; external temperature; set radio station; name of last song played; name of last artist played; message displayed on in-vehicle infotainment screen; or a message displayed on instrument panel cluster.

5. The method of claim 1, wherein the mobile device is a smart phone, a laptop computer, a tablet computer, or a wearable device.

6. The method of claim 1, wherein the mobile device is connected to the vehicle system wirelessly.

7. A method for connecting a mobile device to a vehicle system of a vehicle comprising:
    generating a passkey with a secret key generator onboard the vehicle based on vehicle data accessible to an occupant of the vehicle;
    transmitting instructions for composing the passkey from the vehicle to the mobile device without transmitting the passkey;
    receiving an encrypted transmission from the mobile device including the passkey input by a user of the mobile device;
    decrypting the encrypted transmission, and comparing the passkey input by the user at the mobile device to the passkey generated with the secret key generator; and
    wirelessly connecting the mobile device to the vehicle system when the passkey input by the user at the mobile device matches the passkey generated by the secret key generator, thereby authenticating the user of the mobile device as authorized to access the vehicle system by way of the mobile device.

8. The method of claim 7, further comprising generating the passkey based on one or more of the following: tire pressure reading from one or more wheels; vehicle position; odometer reading; cabin temperature; external temperature; set radio station; name of last song played; name of last artist played; message displayed on in-vehicle infotainment screen; or a message displayed on an instrument panel cluster.

9. The method of claim 7, wherein the mobile device is a smart phone, a laptop computer, a tablet computer, or a wearable device.

10. The method of claim 7, further comprising generating the passkey based on a mathematical formula.

11. A system for connecting a mobile device to a vehicle system comprising:
    secret key generator circuitry that generates a passkey based on vehicle data accessible to an occupant of the vehicle;
    transmitter circuitry that transmits instructions to the mobile device for composing the passkey; and
    pairing system circuitry for wirelessly pairing the mobile device to the vehicle system subsequent to entry of the passkey at the mobile device, entry of the passkey at the mobile device authenticates a user of the mobile device as authorized to access the vehicle system by way of the mobile device;
    wherein the passkey is not transmitted to the mobile device; and
    wherein the secret key generator and the transmitter are configured to be mounted in the vehicle.

12. The system of claim 11, wherein the secret key generator is configured to generate the passkey based on vehicle data including one of more of the following: tire pressure from one or more wheels; vehicle position; odometer reading; cabin temperature; set radio station; name of last song played; name of last artist played; message displayed on in-vehicle infotainment (IVI) screen; or message displayed on instrument panel cluster.

13. The system of claim 11, wherein the mobile device is a smart phone, a laptop computer, a tablet computer, or a wearable device.

14. The system of claim 11, wherein the mobile device is wirelessly paired with the vehicle system.

15. The system of claim 14, wherein the secret key generator is further configured to generate the passkey based on a mathematical formula.

* * * * *